(12) United States Patent
Dong et al.

(10) Patent No.: US 11,577,234 B2
(45) Date of Patent: *Feb. 14, 2023

(54) THREE-ZONE TWO-LAYER TWC CATALYST IN GASOLINE WASTE GAS APPLICATIONS

(71) Applicant: Johnson Matthey (Shanghai) Chemicals LTD., Shanghai (CN)

(72) Inventors: Wenjie Dong, Shanghai (CN); Hongyu Ji, Shanghai (CN); Dongsheng Qiao, Shanghai (CN); Yaping Wan, Shanghai (CN)

(73) Assignee: Johnson Matthey (Shanghai) Chemicals Limited, Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/305,899

(22) Filed: Jul. 16, 2021

(65) Prior Publication Data

US 2021/0346878 A1   Nov. 11, 2021

Related U.S. Application Data

(63) Continuation of application No. 15/733,192, filed as application No. PCT/CN2018/119727 on Dec. 7, 2018, now Pat. No. 11,110,447.

(30) Foreign Application Priority Data

Dec. 8, 2017 (CN) .......................... 201711293252.8

(51) Int. Cl.
*B01D 53/94* (2006.01)
*B01J 23/63* (2006.01)
*B01J 35/00* (2006.01)
*F01N 3/10* (2006.01)
*F01N 3/28* (2006.01)

(52) U.S. Cl.
CPC ...... *B01J 35/0006* (2013.01); *B01D 53/9468* (2013.01); *B01D 53/9472* (2013.01); *B01J 23/63* (2013.01); *F01N 3/101* (2013.01); *F01N 3/2825* (2013.01); *B01D 2255/1023* (2013.01); *B01D 2255/1025* (2013.01); *B01D 2255/908* (2013.01); *B01D 2255/9022* (2013.01); *B01D 2255/9035* (2013.01); *B01D 2255/9155* (2013.01); *B01D 2255/9202* (2013.01); *F01N 2330/06* (2013.01); *F01N 2370/02* (2013.01)

(58) Field of Classification Search
CPC ...... B01J 23/44; B01J 23/464; B01J 35/0006; B01J 23/63; B01J 37/0244; B01J 2523/00; B01J 35/04; B01J 2523/21; B01J 2523/3706; B01J 2523/3712; B01J 2523/48; B01J 2523/822; B01J 2523/25; B01J 2523/31; B01J 2523/824; B01D 2255/2065; B01D 53/945; B01D 2255/407; B01D 2255/9032; B01D 53/9472; B01D 2255/2042; B01D 2255/908; B01D 2255/9207; B01D 2255/9202; B01D 2255/1023; B01D 53/9468; B01D 2255/1025; B01D 2255/9022; B01D 2255/20715; B01D 2255/9035; F01N 2330/06; F01N 2570/16; F01N 3/2803; F01N 2510/0684; F01N 2570/12; F01N 3/2825; F01N 3/101; F01N 2570/14; F01N 2370/02; F01N 2510/0682; F01N 2260/14; F01N 2570/10; Y02T 10/12

See application file for complete search history.

(56) References Cited

U.S. PATENT DOCUMENTS

| | | | |
|---|---|---|---|
| 6,022,825 A | 2/2000 | Andersen et al. | |
| 7,524,465 B2 | 4/2009 | Kumar et al. | |
| 9,040,003 B2 | 5/2015 | Andersen et al. | |
| 9,352,279 B2 | 5/2016 | Greenwell | |
| 9,440,192 B2 | 9/2016 | Hoke et al. | |
| 11,110,447 B2* | 9/2021 | Dong | B01J 37/0244 |
| 2004/0001781 A1* | 1/2004 | Kumar | F01N 13/0097 |
| | | | 422/177 |
| 2007/0116870 A1 | 5/2007 | Dettling et al. | |
| 2010/0104491 A1 | 4/2010 | Deeba et al. | |
| 2010/0183490 A1 | 7/2010 | Hoke et al. | |
| 2011/0271664 A1* | 11/2011 | Boorse | B01J 37/024 |
| | | | 422/171 |
| 2012/0031085 A1 | 2/2012 | Zhang et al. | |
| 2013/0287660 A1 | 10/2013 | Nunan et al. | |
| 2013/0310248 A1 | 11/2013 | Aoki et al. | |
| 2014/0357480 A1 | 12/2014 | Aoki | |

(Continued)

FOREIGN PATENT DOCUMENTS

| | | |
|---|---|---|
| CN | 1607036 A | 4/2005 |
| CN | 1671471 A | 9/2005 |

(Continued)

*Primary Examiner* — Timothy C Vanoy
(74) *Attorney, Agent, or Firm* — Ni Yan

(57) ABSTRACT

A three-way catalyst article, and its use in an exhaust system for internal combustion engines, is disclosed. The catalyst article for treating exhaust gas comprising: a substrate comprising an inlet end, an outlet end with an axial length L; an inlet catalyst layer beginning at the inlet end and extending for less than the axial length L, wherein the inlet catalyst layer comprises an inlet palladium component; an outlet catalyst layer beginning at the outlet end and extending for less than the axial length L, wherein the outlet catalyst layer comprises an outlet rhodium component; and wherein the outlet catalyst layer overlaps with the inlet catalyst layer.

20 Claims, 1 Drawing Sheet

(56) References Cited

U.S. PATENT DOCUMENTS

| | | | |
|---|---|---|---|
| 2015/0352523 A1 | 12/2015 | Yuki et al. | |
| 2016/0243501 A1 | 5/2016 | Greenwell | |
| 2016/0228818 A1 | 8/2016 | Chang et al. | |
| 2017/0296968 A1 | 10/2017 | Takeru et al. | |
| 2020/0102868 A1* | 4/2020 | Fujimori | B01J 23/42 |
| 2021/0331142 A1* | 10/2021 | Qiao | B01D 53/9454 |

FOREIGN PATENT DOCUMENTS

| | | | |
|---|---|---|---|
| CN | 103201019 A | 7/2013 | |
| CN | 208057201 U | 11/2018 | |
| EP | 1952884 A1 | 8/2008 | |
| JP | 2008-290065 A | 12/2008 | |
| JP | 2012-35206 A | 2/2012 | |
| JP | 2012-152702 A | 8/2012 | |
| JP | 2013-136032 A | 7/2013 | |
| RU | 2620425 C | 5/2017 | |
| WO | 2012/020299 A1 | 2/2012 | |
| WO | 2012069404 A1 | 5/2012 | |
| WO | 2012/101505 A1 | 8/2012 | |
| WO | 2017159628 A1 | 9/2017 | |
| WO | 2017163985 A1 | 9/2017 | |
| WO | WO 2017 159 628 A1 * | 9/2017 | F01N 3/2839 |

\* cited by examiner

Inlet:

Inlet:

Inlet:

THREE-ZONE TWO-LAYER TWC CATALYST IN GASOLINE WASTE GAS APPLICATIONS

FIELD OF THE INVENTION

The present invention relates to a catalyzed article useful in treating exhaust gas emissions from gasoline engines.

BACKGROUND OF THE INVENTION

Internal combustion engines produce exhaust gases containing a variety of pollutants, including hydrocarbons (HCs), carbon monoxide (CO), and nitrogen oxides ("$NO_x$"). Emission control systems, including exhaust gas catalysts, are widely utilized to reduce the amount of these pollutants emitted to atmosphere. A commonly used catalyst for gasoline engine applications is the TWC. TWCs perform three main functions: (1) oxidation of CO; (2) oxidation of unburnt HCs; and (3) reduction of $NO_x$ to $N_2$.

In most catalytic converters, the TWC is coated onto a high surface area substrate that can withstand high temperatures, such as flow-through honeycomb monoliths. The large surface area of these substrates facilitates the desired heterogeneous reactions, but can also contribute to the increase of exhaust backpressure, i.e., restrictions on the flow of exhaust gas from the engine to the tail pipe. High backpressure in an exhaust system can reduce the engine's fuel economy and power output. Despite advances in TWC technology such as those described in U.S. Pat. Nos. 6,022,825, 9,352,279, 9,040,003, and US Pat. Publication No. 2016/0228818, there remains a need for improved catalytic converters for certain engine platforms that simultaneously produce high conversion rates and low back pressure. This invention solves these problems amongst others.

SUMMARY OF THE INVENTION

One aspect of the present disclosure is directed to a catalyst article for treating exhaust gas comprising: a substrate comprising an inlet end, an outlet end with an axial length L; an inlet catalyst layer beginning at the inlet end and extending for less than the axial length L, wherein the inlet catalyst layer comprises an inlet palladium component; an outlet catalyst layer beginning at the outlet end and extending for less than the axial length L, wherein the outlet catalyst layer comprises an outlet rhodium component; and wherein the outlet catalyst layer overlaps with the inlet catalyst layer.

The invention also encompasses an exhaust system for internal combustion engines that comprises the three-way catalyst component of the invention.

The invention also encompasses treating an exhaust gas from an internal combustion engine, in particular for treating exhaust gas from a gasoline engine. The method comprises contacting the exhaust gas with the three-way catalyst component of the invention.

DETAILED DESCRIPTION OF THE INVENTION

Figure 1:
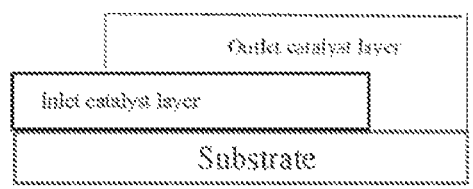
FIG. 1 shows a catalyst article having an inlet catalyst layer and an outlet catalyst layer. The inlet catalyst layer is fully supported/deposited directly on the substrate. The outlet catalyst layer is partially supported/deposited directly on the substrate and partially supported/deposited on the top of the inlet catalyst layer.

The present invention is directed to the catalytic conversion of combustion exhaust gas, such as that produced by gasoline engines or other engines, and to related catalytic articles and systems. More specifically, the invention relates the simultaneous treatment of $NO_x$, CO, and HC in a vehicular exhaust system. The inventors have discovered a synergistic relationship between the certain catalytically active metals and their orientation that unexpectedly produces both a high conversion rate for $NO_x$, CO, and HC while simultaneously generating low backpressure. The processes of the present invention also reduce processing time and lower costs of the catalyst.

One aspect of the present disclosure is directed to a catalyst article for treating exhaust gas comprising: a substrate comprising an inlet end, an outlet end with an axial length L; an inlet catalyst layer beginning at the inlet end and extending for less than the axial length L, wherein the inlet catalyst layer comprises an inlet palladium component; an outlet catalyst layer beginning at the outlet end and extending for less than the axial length L, wherein the outlet catalyst layer comprises an outlet rhodium component; and wherein the outlet catalyst layer overlaps with the inlet catalyst layer.

The catalyst article of the present invention can have three catalyst zones along the axis of the substrate: an upstream zone coated only with the inlet catalyst layer, a middle zone coated with both the inlet and the outlet catalyst layers, and a downstream zone coated only with the outlet catalyst layer.

The inventors have found that these catalysts with various orientations produce a synergistic effect in both improving catalyst performance and decreasing backpressure that is not achieved using the catalyst separately or in conventional orientations. Among the unexpected benefits of the present invention are lower backpressure compared to conventional TWC catalysts of similar concentration (washcoat loadings) and improved catalytic performance compared to conventional TWC catalyst, even when the conventional TWC is at higher concentrations. These benefits lead to improved engine performance, improved fuel economy, and lower costs.

The inlet catalyst layer of the catalyst article can extend for 50 to 99 percent of the axial length L. Preferably, the inlet catalyst layer can extend for 55 to 95 percent, 60 to 90 percent, more preferably, 65 to 85 percent, of the axial length L. (E.g., see FIGS. 1 and 2).

The outlet catalyst layer of the catalyst article can extend for 50 to 99 percent of the axial length L. Preferably, the outlet catalyst layer can extend for 55 to 95 percent, 60 to 90 percent, more preferably, 65 to 85 percent, of the axial length L. (E.g., see FIGS. 1 and 2).

The inlet catalyst layer can be essentially free of PGM metals other than the inlet palladium component.

The inlet catalyst layer can comprise PGM metals other than the inlet palladium component, such as platinum and/or rhodium. The inlet catalyst layer can comprise up to 300 g/ft³ of the inlet palladium or platinum palladium component. Preferably, the inlet catalyst layer can comprise 10-200 g/ft³, more preferably, 20-150 g/ft³ of the inlet palladium or platinum palladium component, wherein the weight ratio of platinum to palladium can be 60:1 to 1:60, preferably 30:1 to 1:30, more preferably 10:1 to 1:10.

The inlet catalyst layer can further comprise an inlet inorganic oxide material, an oxygen storage capacity (OSC) material, an inlet alkali or alkali earth metal component, and/or an inlet inorganic oxide.

The total washcoat loading of the inlet catalyst layer can be from 0.1 to 5 g/in³. Preferably, the total washcoat loading of the inlet catalyst layer is 0.5 to 3.5 g/in³, most preferably, the total washcoat loading of the inlet catalyst layer is 1 to 2.5 g/in³.

The inlet OSC material is preferably selected from the group consisting of cerium oxide, zirconium oxide, a ceria-zirconia mixed oxide, and an alumina-ceria-zirconia mixed oxide. More preferably, the inlet OSC material comprises the ceria-zirconia mixed oxide. The ceria-zirconia mixed oxide can further comprise some dopants, such as, La, Nd, Y, Pr, etc.

The ceria-zirconia mixed oxide can have a molar ratio of zirconia to ceria at least 50:50, preferably, higher than 60:40, more preferably, higher than 75:25. In addition, the inlet OSC material may function as a support material for the inlet palladium component.

The inlet OSC material (e.g., ceria-zirconia mixed oxide) can be from 10 to 90 wt %, preferably, 25-75 wt %, more preferably, 35-65 wt %, based on the total washcoat loading of the inlet catalyst layer.

The inlet OSC material loading in the inlet catalyst layer can be less than 1.5 g/in³. In some embodiments, the inlet OSC material loading in the inlet catalyst layer is no greater than 1.2 g/in³, 1.0 g/in³, 0.9 g/in³, 0.8 g/in³, 0.7 g/in³, or 0.6 g/in³.

In some embodiments, the inlet alkali or alkali earth metal may be deposited on the inlet OSC material. Alternatively, or in addition, the inlet alkali or alkali earth metal may be deposited on the inlet inorganic oxide. That is, in some embodiments, the inlet alkali or alkali earth metal may be deposited on, i.e. present on, both the inlet OSC material and the inlet inorganic oxide.

Preferably the inlet alkali or alkali earth metal is supported/deposited on the inlet inorganic oxide (e.g., alumina). In addition to, or alternatively to, being in contact with the inlet inorganic oxide, the inlet alkali or alkali earth metal may be in contact with the inlet OSC material and also the inlet palladium component.

The inlet alkali or alkali earth metal is preferably barium or strontium. Preferably the barium or strontium, where present, is present in an amount of 0.1 to 15 weight percent, and more preferably 3 to 10 weight percent barium, based on the total weight of the inlet catalyst layer.

Preferably the barium is present as $BaCO_3$. Such a material can be performed by any method known in the art, for example incipient wetness impregnation or spray-drying.

The inlet inorganic oxide is preferably an oxide of Groups 2, 3, 4, 5, 13 and 14 elements. The inlet inorganic oxide is preferably selected from the group consisting of alumina, ceria, magnesia, silica, niobia, lanthanum, zirconium, neodymium, praseodymium oxides and mixed oxides or composite oxides thereof. Particularly preferably, the inlet inorganic oxide is alumina, a lanthanum/alumina composite oxide, or a magnesia/alumina composite oxide. One especially preferred inlet inorganic oxide is a lanthanum/alumina composite oxide or a magnesia/alumina composite oxide.

The inlet inorganic oxide may be a support material for the inlet palladium component, and/or for the inlet alkali or alkali earth metal.

Preferred inlet inorganic oxides preferably have a fresh surface area of greater than 80 m²/g, pore volumes in the range 0.1 to 4 mL/g. High surface area inorganic oxides having a surface area greater than 100 m²/g are particularly preferred, e.g. high surface area alumina. Other preferred inlet inorganic oxides include lanthanum/alumina composite oxides, optionally further comprising a cerium-containing component, e.g. ceria. In such cases the ceria may be present on the surface of the lanthanum/alumina composite oxide, e.g. as a coating.

The inlet OSC material and the inlet inorganic oxide can have a weight ratio of no greater than 10:1, preferably, no greater than 8:1 or 5:1, more preferably, no greater than 4:1 or 3:1, most preferably, no greater than 2:1.

Alternatively, the inlet OSC material and the inlet inorganic oxide can have a weight ratio of 10:1 to 1:10, preferably, 8:1 to 1:8 or 5:1 to 1:5; more preferably, 4:1 to 1:4 or 3:1 to 1:3; and most preferably, 2:1 to 1:2.

The outlet catalyst layer can be essentially free of PGM metals other than the outlet rhodium component.

The outlet catalyst layer can comprise 1-20 g/ft³ of the outlet rhodium or platinum rhodium component. Preferably, the outlet catalyst layer can comprise 2-15 g/ft³, more preferably, 3-10 g/ft³ of the outlet rhodium or platinum rhodium component, wherein the weight ratio of platinum to rhodium can be 20:1 to 1:20, preferably 15:1 to 1:15, more preferably 10:1 to 1:10.

The total washcoat loading of the outlet catalyst layer can be 0.1 to 3.5 g/in³. Preferably, the total washcoat loading of the outlet catalyst layer is 0.5 to 3 g/in³, most preferably, the total washcoat loading of the outlet catalyst layer is 0.6 to 2 g/in³.

The outlet catalyst layer can further comprise an outlet oxygen storage capacity (OSC) material, an outlet alkali or alkali earth metal component, and/or an outlet inorganic oxide.

The outlet OSC material is preferably selected from the group consisting of cerium oxide, zirconium oxide, a ceria-zirconia mixed oxide, and an alumina-ceria-zirconia mixed oxide. More preferably, the outlet OSC material comprises the ceria-zirconia mixed oxide. The ceria-zirconia mixed oxide can further comprise some dopants, such as, lanthanum, neodymium, praseodymium, yttrium, etc.

The ceria-zirconia mixed oxide can have a molar ratio of zirconia to ceria at least 50:50, preferably, higher than 60:40, more preferably, higher than 80:20. In addition, the outlet OSC material may function as a support material for the outlet rhodium component.

The outlet OSC material (e.g., bulk ceria) can be from 10 to 90 wt %, preferably, 25-75 wt %, more preferably, 35-65 wt %, based on the total washcoat loading of the outlet catalyst layer.

The outlet OSC material loading in the outlet catalyst layer can be less than 1.5 g/in³. In some embodiments, the outlet OSC material loading in the outlet catalyst layer is no greater than 1.2 g/in³, 1.1 g/in³, or 1.0 g/in³.

The outlet alkali or alkali earth metal is preferably barium or strontium. Preferably the barium or strontium, where present, is present in an amount of 0.1 to 15 weight percent, and more preferably 3 to 10 weight percent barium, based on the total weight of the outlet catalyst layer.

Preferably the barium is present as $BaCO_3$. Such a material can be performed by any method known in the art, for example incipient wetness impregnation or spray-drying.

The outlet catalyst layer is preferably substantially free of the outlet alkali or alkali earth metal. More preferably, the outlet catalyst layer is essentially free of the outlet alkali or alkali earth metal The outlet inorganic oxide is preferably an oxide of Groups 2, 3, 4, 5, 13 and 14 elements. The outlet inorganic oxide is preferably selected from the group consisting of alumina, ceria, magnesia, silica, niobia, lanthanum, zirconium, neodymium, praseodymium oxides and mixed oxides or composite oxides thereof. Particularly preferably, the outlet inorganic oxide is alumina, a lanthanum/alumina composite oxide, or a magnesia/alumina composite oxide. One especially preferred outlet inorganic oxide is a lanthana/alumina composite oxide or a magnesia/alumina or a zirconium/alumina composite oxide. The outlet inorganic oxide may be a support material for the outlet rhodium component.

The outlet OSC material and the outlet inorganic oxide can have a weight ratio of no greater than 10:1, preferably, no greater than 8:1 or 5:1, more preferably, no greater than 4:1, most preferably, no greater than 3:1.

Alternatively, the outlet OSC material and the outlet inorganic oxide can have a weight ratio of 10:1 to 1:10, preferably, 8:1 to 1:8 or 5:1 to 1:5; more preferably, 4:1 to 1:4; and most preferably, 3:1 to 1:3.

In some embodiments, the outlet rhodium component and the inlet palladium component has a weight ratio of from 60:1 to 1:60. Preferably, the outlet rhodium component and the inlet palladium component has a weight ratio of from 30:1 to 1:30. More preferably, the out rhodium component and the inlet palladium component has a weight ratio of from 20:1 to 1:20. Most preferably, the outlet rhodium component and the inlet palladium component has a weight ratio of from 15:1 to 1:15.

The catalyst article of the invention may comprise further components that are known to the skilled person. For example, the compositions of the invention may further comprise at least one binder and/or at least one surfactant. Where a binder is present, dispersible alumina binders are preferred.

Preferably the substrate is a flow-through monolith, or wall flow gasoline particulate filter. More preferably, the substrate is a flow-through monolith.

The substrate can be less than 100 mm in length, preferably from 50 to 90 mm.

The flow-through monolith substrate has a first face and a second face defining a longitudinal direction there between. The flow-through monolith substrate has a plurality of channels extending between the first face and the second face. The plurality of channels extend in the longitudinal direction and provide a plurality of inner surfaces (e.g. the surfaces of the walls defining each channel). Each of the plurality of channels has an opening at the first face and an opening at the second face. For the avoidance of doubt, the flow-through monolith substrate is not a wall flow filter.

The first face is typically at an inlet end of the substrate and the second face is at an outlet end of the substrate.

The channels may be of a constant width and each plurality of channels may have a uniform channel width.

Preferably within a plane orthogonal to the longitudinal direction, the monolith substrate has from 100 to 900 channels per square inch, preferably from 300 to 750. For example, on the first face, the density of open first channels and closed second channels is from 300 to 750 channels per square inch. The channels can have cross sections that are rectangular, square, circular, oval, triangular, hexagonal, or other polygonal shapes.

The monolith substrate acts as a support material for holding catalytic material. Suitable materials for forming the monolith substrate include ceramic-like materials such as cordierite, silicon carbide, silicon nitride, zirconia, mullite, spodumene, alumina-silica magnesia or zirconium silicate, or of porous, refractory metal. Such materials and their use in the manufacture of porous monolith substrates is well known in the art.

It should be noted that the flow-through monolith substrate described herein is a single component (i.e. a single brick). Nonetheless, when forming an emission treatment system, the monolith used may be formed by adhering together a plurality of channels or by adhering together a plurality of smaller monoliths as described herein. Such techniques are well known in the art, as well as suitable casings and configurations of the emission treatment system.

In embodiments wherein the catalyst article of the present comprises a ceramic substrate, the ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

In embodiments wherein the catalyst article of the present invention comprises a metallic substrate, the metallic substrate may be made of any suitable metal, and in particular heat-resistant metals and metal alloys such as titanium and stainless steel as well as ferritic alloys containing iron, nickel, chromium, and/or aluminum in addition to other trace metals.

As shown in FIG. 1, the inlet catalyst layer is fully supported/deposited directly on the substrate. The outlet catalyst layer is partially supported/deposited directly on the substrate and partially supported/deposited on the top of the inlet catalyst layer. Thus, the middle zone comprises both the inlet catalyst layer and the outlet catalyst layer.

Figure 2:
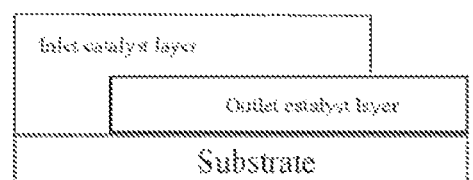
FIG. 2 shows a catalyst article having an inlet catalyst layer and an outlet catalyst layer. The outlet catalyst layer is fully supported/deposited directly on the substrate. The inlet catalyst layer is partially supported/deposited directly on the substrate and partially supported/deposited on the top of the outlet catalyst layer.

As shown in FIG. 2, the outlet catalyst layer is fully supported/deposited directly on the substrate. The inlet catalyst layer is partially supported/deposited directly on the substrate and partially supported/deposited on the top of the outlet catalyst layer. Thus, the middle zone comprises both the outlet catalyst layer and the inlet catalyst layer.

Another aspect of the present disclosure is directed to a method for treating a vehicular exhaust gas containing $NO_x$, CO, and HC using the catalyst article described herein. Catalytic converters equipped with TWC made according to the invention not only show improved or comparable catalytic performance compared to conventional TWC, but also show a significant improvement in backpressure (e.g., see Examples 1 and 2 and Tables 1 and 2).

Another aspect of the present disclosure is directed to a system for treating vehicular exhaust gas comprising the catalyst article described herein in conjunction with a conduit for transferring the exhaust gas through the system.

Definitions

The term "washcoat" is well known in the art and refers to an adherent coating that is applied to a substrate usually during production of a catalyst.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The expression "consist essentially" as used herein limits the scope of a feature to include the specified materials or steps, and any other materials or steps that do not materially affect the basic characteristics of that feature, such as for example minor impurities. The expression "consist essentially of" embraces the expression "consisting of".

The expression "substantially free of" as used herein with reference to a material, typically in the context of the content of a region, a layer or a zone, means that the material in a minor amount, such as ≤5% by weight, preferably ≤2% by weight, more preferably ≤1% by weight. The expression "substantially free of" embraces the expression "does not comprise."

The expression "essentially free of" as used herein with reference to a material, typically in the context of the content of a region, a layer or a zone, means that the material in a trace amount, such as ≤1% by weight, preferably ≤0.5% by weight, more preferably ≤0.1% by weight. The expression "essentially free of" embraces the expression "does not comprise."

Any reference to an amount of dopant, particularly a total amount, expressed as a % by weight as used herein refers to the weight of the support material or the refractory metal oxide thereof.

The term "loading" as used herein refers to a measurement in units of $g/ft^3$ on a metal weight basis.

The following examples merely illustrate the invention. Those skilled in the art will recognize many variations that are within the spirit of the invention and scope of the claims.

EXAMPLES

Materials

All materials are commercially available and were obtained from known suppliers, unless noted otherwise.

Catalyst 1 (Comparative)

Figure 3:
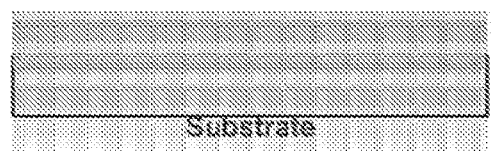
FIG. 3 shows a comparative commercial catalyst article having two layers on the substrate with one zone.

Catalyst 1 is a commercial three-way (Pd—Rh) catalyst with a double-layered structure (e.g., as shown in FIG. 3). The bottom layer consists of Pd supported on a washcoat of a first CeZr mixed oxide, La-stabilized alumina, and Ba promotor. The washcoat loading of the bottom layer was about 2.2 $g/in^3$ with a Pd loading of 75 $g/ft^3$. The top layer consists of Rh supported on a washcoat of a second CeZr mixed oxide, La-stabilized alumina. The washcoat lading of the top layer was about 1.6 $g/in^3$ with a Rh loading of 5 $g/ft^3$. The total washcoat loading of Catalyst 1 was about 3.8 $g/in^3$.

Catalyst 2

Catalyst 2 was prepared according to the present invention. The bottom layer consists of Pd supported on a washcoat of an inlet CeZr mixed oxide, La-stabilized alumina, and Ba promotor. The washcoat loading of the bottom layer was about 2.2 $g/in^3$ with a Pd loading of 75 $g/ft^3$. The top layer consists of Rh supported on a washcoat of an outlet CeZr mixed oxide, La-stabilized alumina. The washcoat lading of the top layer was about 1.6 $g/in^3$ with a Rh loading of 5 $g/ft^3$. The total washcoat loading of Catalyst 2 (middle zone) was about 3.8 $g/in^3$.

The final slurry of bottom layer containing Pd was coated from the inlet face of the same substrate as Comparative Catalyst 1 using standard coating procedures with coating depth targeted of 80% of the substrate length, dried at 90° C. Then the top layer slurry containing Rh was coated from the outlet face of the substrate containing dried bottom layer using standard coating procedures with coating depth targeted of 80% of the substrate length, then dried at 90° C. and calcined at 500° C. for 45 mins.

Catalyst 3

Catalyst 3 was prepared according to the present invention. The bottom layer consists of Pd supported on a washcoat of an inlet CeZr mixed oxide, La-stabilized alumina, and Ba promotor. The washcoat loading of the bottom layer was about 1.9 $g/in^3$ with a Pd loading of 75 $g/ft^3$. The top layer consists of Rh supported on a washcoat of an outlet CeZr mixed oxide, La-stabilized alumina. The washcoat lading of the top layer was about 1.5 $g/in^3$ with a Rh loading of 5 $g/ft^3$. The total washcoat loading of Catalyst 3 (middle zone) was about 3.4 $g/in^3$.

The final slurry of bottom layer containing Pd was coated from the inlet face of the same substrate as Comparative Catalyst 1 using standard coating procedures with coating depth targeted of 80% of the substrate length, dried at 90° C. Then the top layer slurry containing Rh was coated from the outlet face of the substrate containing dried bottom layer using standard coating procedures with coating depth targeted of 80% of the substrate length, then dried at 90° C. and calcined at 500° C. for 45 mins.

Catalyst 4

Catalyst 4 was prepared according to the present invention. The bottom layer consists of Pd supported on a washcoat of an inlet CeZr mixed oxide, La-stabilized alumina, and Ba promotor. The washcoat loading of the bottom layer was about 1.7 $g/in^3$ with a Pd loading of 75 $g/ft^3$. The top layer consists of Rh supported on a washcoat of an outlet CeZr mixed oxide, La-stabilized alumina. The washcoat lading of the top layer was about 1.3 $g/in^3$ with a Rh loading of 5 $g/ft^3$. The total washcoat loading of Catalyst 4 (middle zone) was about 3.0 $g/in^3$.

The final slurry of bottom layer containing Pd was coated from the inlet face of the same substrate as Comparative Catalyst 1 using standard coating procedures with coating depth targeted of 80% of the substrate length, dried at 90° C. Then the top layer slurry containing Rh was coated from the outlet face of the substrate containing dried bottom layer using standard coating procedures with coating depth targeted of 80% of the substrate length, then dried at 90° C. and calcined at 500° C. for 45 mins.

EXPERIMENTAL RESULTS

Example 1

Comparative Catalyst 1 and Catalysts 2-4 were bench aged for 200 hours with four mode aging cycles, with peak temperature at about 980° C. Vehicle emissions were conducted over a commercial vehicle with 1.4 litre engine. Emissions were measured pre- and post-catalyst.

TABLE 1

Results of Exhaust Emissions by Vehicle Diluted Bag Data

| | Exhaust Emissions (g/km) | | | |
|---|---|---|---|---|
| | HC | NMHC | CO/10 | $NO_x$ |
| Comparative Catalyst 1 | 0.047 | 0.031 | 0.050 | 0.018 |
| Catalyst 2 | 0.045 | 0.028 | 0.054 | 0.021 |
| Catalyst 3 | 0.044 | 0.026 | 0.057 | 0.015 |
| Catalyst 4 | 0.042 | 0.026 | 0.058 | 0.017 |

As shown in Table 1, Catalyst 4 showed comparable or even improved catalyst performances (e.g., seethe improved performance related to the THC/NMHC emission, from 0.047/0.031 g/km to 0.042/0.026 g/km, with 11% and 16% improvement respectively, when Catalyst 4 was compared with Comparative Catalyst 1), even with lower total washcoat loading of about 80% of such in Comparative Catalyst 1.

Example 2

Comparative Catalyst 1, Catalyst 2, and Catalyst 4 were coated on the same substrate type, cpsi and dimensions, then they were evaluated for Cold Flow Backpressure at air flow rates of 200, 300, 400, and 600 m³/h.

The percentage increase in backpressure over the bare substrate for Comparative Catalyst 1, Catalyst 2, and Catalyst 4 are shown in Table 2. The data indicate that the multi-zoned Catalyst 4 have significantly lower contribution to backpressure than the standard two-layer example of Catalyst 1.

TABLE 2

Catalyst Cold Flow Backpressure Test Results

| Flow Rate (m³/h) | Backpressure (% increase over bare substrate) | | |
|---|---|---|---|
| | Comparative Catalyst 1 | Catalyst 2 | Catalyst 4 |
| 200 | 40 | 38 | 27 |
| 300 | 41 | 37 | 28 |
| 400 | 40 | 36 | 26 |
| 600 | 40 | 37 | 27 |

We claim:

1. A catalyst article for treating exhaust gas comprising:
a substrate comprising an inlet end, an outlet end with an axial length L;
an inlet catalyst layer beginning at the inlet end and extending for 65 to 85 percent of the axial length L, wherein the inlet catalyst layer comprises an inlet palladium component;
an outlet catalyst layer beginning at the outlet end and extending for 60 to 90 percent of the axial length L, wherein the outlet catalyst layer comprises an outlet rhodium component; and
wherein the outlet catalyst layer overlaps with the inlet catalyst layer.

2. The catalyst article of claim 1, wherein the outlet catalyst layer extends for 65 to 85 percent of the axial length L.

3. The catalyst article of claim 1, wherein the inlet catalyst layer is essentially free of PGM metals other than the inlet palladium component.

4. The catalyst article of claim 1 wherein the inlet layer comprises up to 300 g/ft³ of the inlet palladium component.

5. The catalyst article of claim 1, wherein the outlet catalyst layer is essentially free of PGM metals other than the outlet rhodium component.

6. The catalyst article of claim 1, wherein the outlet layer comprises 1-20 g/ft³ of the outlet rhodium component.

7. The catalyst article of claim 1, wherein the inlet catalyst layer further comprises an inlet oxygen storage capacity (OSC) material, an inlet alkali or alkali earth metal component, and/or an inlet inorganic oxide.

8. The catalyst article of claim 1, wherein the outlet catalyst layer further comprises an outlet oxygen storage capacity (OSC) material, and/or an outlet inorganic oxide.

9. The catalyst article of claim 1, wherein the substrate is a flow-through monolith or a wall flow filter.

10. The catalyst article of claim 1, wherein the substrate is less than 100 mm in length.

11. The catalyst article of claim 1, wherein the inlet catalyst layer is supported/deposited directly on the substrate.

12. The catalyst article of claim 1, wherein the outlet catalyst layer is supported/deposited directly on the substrate.

13. The catalyst article of claim 1, wherein the inlet catalyst layer further comprises platinum and/or rhodium.

14. The catalyst article of claim 1, wherein the outlet catalyst layer further comprises platinum.

15. An emission treatment system for treating a flow of a combustion exhaust gas comprising the catalyst article of claim 1.

16. A method of treating an exhaust gas from an internal combustion engine comprising contacting the exhaust gas with the catalyst article of claim 1.

17. A catalyst article for treating exhaust gas comprising:
a substrate comprising an inlet end, an outlet end with an axial length L;
an inlet catalyst layer beginning at the inlet end and extending for 60 to 90 percent of the axial length L, wherein the inlet catalyst layer comprises an inlet palladium component;
an outlet catalyst layer beginning at the outlet end and extending for 65 to 85 percent of the axial length L, wherein the outlet catalyst layer comprises an outlet rhodium component; and
wherein the outlet catalyst layer overlaps with the inlet catalyst layer.

18. The catalyst article of claim 17 wherein the inlet layer comprises up to 300 g/ft³ of the inlet palladium component.

19. The catalyst article of claim 17, wherein the outlet layer comprises 1-20 g/ft³ of the outlet rhodium component.

20. The catalyst article of claim 17, wherein the substrate is a flow-through monolith or a wall flow filter.

* * * * *